(12) United States Patent
Chavanne

(10) Patent No.: US 7,686,038 B2
(45) Date of Patent: Mar. 30, 2010

(54) SOLENOID VALVE WITH FITTED SHOULDER

(75) Inventor: Samuel Chavanne, Mieussy (FR)

(73) Assignee: Bontaz Centre, Marnaz (FR)

( * ) Notice: Subject to any disclaimer, the term of this patent is extended or adjusted under 35 U.S.C. 154(b) by 55 days.

(21) Appl. No.: 11/452,665

(22) Filed: Jun. 14, 2006

(65) Prior Publication Data
US 2006/0278838 A1 Dec. 14, 2006

(30) Foreign Application Priority Data
Jun. 14, 2005 (FR) .................................. 05 06242

(51) Int. Cl.
*F16K 31/06* (2006.01)
(52) U.S. Cl. .............................. 137/625.65; 251/129.14
(58) Field of Classification Search ............ 137/625.65; 251/129.14
See application file for complete search history.

(56) References Cited

U.S. PATENT DOCUMENTS

| | | | |
|---|---|---|---|
| 4,578,662 A | | 3/1986 | Slavin et al. |
| 4,790,513 A | * | 12/1988 | Davis et al. ............ 251/129.21 |
| 4,979,542 A | | 12/1990 | Mesenich |
| 4,998,559 A | * | 3/1991 | McAuliffe, Jr. ........ 137/625.65 |
| 5,076,323 A | * | 12/1991 | Schudt .................. 137/596.17 |
| 5,218,999 A | * | 6/1993 | Tanimoto ............... 137/625.65 |
| 5,950,984 A | * | 9/1999 | Anderson et al. ...... 251/129.14 |
| 6,184,766 B1 | * | 2/2001 | Kojima et al. .......... 251/129.14 |
| 6,315,268 B1 | * | 11/2001 | Cornea et al. .......... 251/129.15 |
| 6,336,470 B1 | * | 1/2002 | Zapf ...................... 137/625.65 |
| 6,390,117 B2 | * | 5/2002 | Zapf ...................... 137/625.65 |
| 6,397,891 B1 | * | 6/2002 | Neuhaus et al. ........ 137/625.65 |
| 7,069,951 B2 | * | 7/2006 | Cornea .................. 137/625.68 |
| 7,137,411 B2 | * | 11/2006 | Golovatai-Schmidt et al. ........ 137/625.65 |
| 2004/0041114 A1 | * | 3/2004 | Hirata et al. ............ 251/129.15 |
| 2004/0113112 A1 | | 6/2004 | Hirata et al. |

FOREIGN PATENT DOCUMENTS

| | | |
|---|---|---|
| DE | 38 14 156 | 11/1989 |
| EP | 0 654 627 | 5/1995 |
| JP | 2000 136888 | 5/2000 |

OTHER PUBLICATIONS

French Search Report; Feb. 16, 2006; FR 0 506 242.

* cited by examiner

*Primary Examiner*—Stephen Hepperle
*Assistant Examiner*—Craig Price
(74) *Attorney, Agent, or Firm*—RatnerPrestia

(57) ABSTRACT

Solenoid valve for controlling the flow of a fluid in a hydraulic circuit, comprising a valve body having at least one fluid duct, a stopper for allowing or preventing the flow of fluid in the fluid duct, a mechanical connection to actuate the stopper, an electromagnetic actuator arranged to actuate the mechanical connection, and a coupling between the electromagnetic actuator and the valve body via a jacket surrounding the electromagnetic actuator and engaged on a shoulder of the valve body. The jacket holds the electromagnetic actuator in axial engagement against the valve body in a direction of engagement. The shoulder comprises two matching half-washers engaged radially in a peripheral groove of the valve body.

12 Claims, 2 Drawing Sheets

SOLENOID VALVE WITH FITTED SHOULDER

TECHNICAL FIELD OF THE INVENTION

The present invention relates to solenoid valves for controlling the flow of a fluid in a hydraulic circuit, such as the solenoid valves used to control the flow of liquid for cooling and lubricating pistons in the engines of motor vehicles.

In a general manner, and as described for example in documents JP2000-136888 A, US 2004/0113112 A1 or U.S. Pat. No. 4,578,662 A, solenoid valves for controlling the flow of a fluid in a hydraulic circuit comprise:

a valve body, having at least one fluid duct, a stopper for allowing or preventing the flow of fluid in the fluid duct and a mechanical connection to actuate the stopper, an electromagnetic actuator arranged to actuate the mechanical connection, a coupling between the electromagnetic actuator and the valve body, via a jacket surrounding the electromagnetic actuator and engaged with a shoulder protruding from the valve body, that holds the electromagnetic actuator in axial engagement against the valve body in a direction of engagement.

The valve body is generally cylindrical, in order to be engaged and attached in a sealed manner in a housing provided in a hydraulic block in which the fluid to be controlled circulates. Usually the electromagnetic actuator protrudes from the hydraulic block and is held by its coupling to the valve body. The coupling via a jacket engaged on a shoulder protruding from the valve body makes it possible to attach a magnetic actuator of sufficient power whose external diameter is therefore greater than that of the valve body.

This mode of coupling between the valve body and the electromagnetic actuator, via a protruding shoulder, is costly to produce, just as much in the material used as in the labor and in machine time.

To produce a shoulder protruding on the valve body, that is usually an axi-symmetric piece, it is necessary to begin with a piece that has an external diameter equal to or slightly greater than the external diameter of the shoulder, and to machine this piece over practically the whole of its length in order to substantially diminish its external diameter.

This operation may in particular be carried out by means of a lathe.

Thus a single block valve body blank is obtained by removing a large quantity of material, the shoulder usually being present only over a very short length of the final valve body.

In order that the valve body has a geometric and dimensional quality necessary and sufficient to ensure its sealed engagement in a hydraulic block, a precision grinding is necessary over its whole length.

Because of the presence of the protruding shoulder, it is necessary to make use of a plunge-cut precision grinding. The plunge-cut precision grinding is carried out by a radial forward movement of the grinding mill, a radial forward movement which differs depending on whether the mill comes to precision grind the shoulder or the mill comes to precision grind the part of the valve body whose diameter has previously been reduced during the rough machining. Multiple passes are then necessary due to the limited width of the precision grinding mill that is usually less than the length of the valve body blank.

This method of plunge-cut precision grinding is therefore costly in machine time, in labor and in inspections.

Consequently, the production of a valve body with protruding shoulder has been hitherto costly both during the rough machining and during the precision grinding in order to achieve a valve body that satisfies the geometric and dimensional quality conditions. This geometric and dimensional quality however remains necessary to the very operation of the valve body in the solenoid valve, to ensure good circulation of the fluid in the hydraulic circuit, without leaks or defects in the control of its flow.

Furthermore, from document DE 38 14 156 A1 and its US equivalent U.S. Pat. No. 4,979,542 A, a solenoid valve (FIG. 2) is known in which the actuator is coupled to the valve body via a jacket engaged on a shoulder itself consisting of an axi-symmetric piece fitted to the valve body and attached via a rebate of material. This dispenses with the plunge-cut precision grinding steps, thanks to the absence of a monoblock protruding shoulder on the valve body. But it is necessary to provide the additional and costly operation of material rebating in order to attach the axi-symmetric piece fitted to the valve body. In addition, the mechanical strength of the material rebate is not guaranteed and the result is a risk that clearance may progressively appear and the coupling may break. In addition, the fitted axi-symmetric piece has a complex shape which increases the cost of manufacture.

SUMMARY OF THE INVENTION

A first problem proposed by the invention is to design a solenoid valve structure that can be produced at less cost, reducing the wastage of material, the labor time or else the machine time.

According to another aspect, the object of the invention is to produce such a solenoid valve in which the valve body remains compatible with the current geometric and dimensional requirements, and in which the actuation force produced by the electromagnetic actuator remains compatible with the reliable actuation requirements of the stopper to control the fluid in all circumstances.

Simultaneously, the invention also seeks to produce a shoulder on a valve body that is reliable and that can easily withstand the mechanical stresses associated with the operation of the solenoid valve.

To achieve these objectives, and others, the invention proposes a solenoid valve for controlling the flow of a fluid in a hydraulic circuit, comprising:

a valve body, having at least one fluid duct, at least one peripheral groove, a stopper for allowing or preventing the flow of fluid in the fluid duct and a mechanical connection to actuate the stopper, an electromagnetic actuator arranged to actuate the mechanical connection, a coupling between the electromagnetic actuator and the valve body, via a jacket surrounding the electromagnetic actuator and engaged with a shoulder fitted to the valve body, that holds the electromagnetic actuator in axial engagement against the valve body in a direction of engagement, the shoulder comprising an assembly of two matching half-washers, engaged radially in the peripheral groove and held radially in the peripheral groove by the jacket.

With such a solenoid valve structure, it is then possible to achieve a substantial cost saving in manufacture and assembly, by manufacturing separately the valve body itself and the matching retaining half-washers from pieces of smaller dimensions, without major material wastage. The half-washers form pieces whose simple shape can be produced at low cost. The valve body blank, then having no shoulder, may be precision ground at less cost using a throughfeed precision grinding. During the assembly, the adaptation of the jacket after the matching half-washers are inserted into the peripheral groove simultaneously, in a single operation, attaches the half-washers to the valve body and attaches the electromagnetic actuator to the valve body.

Advantageously, the invention also makes possible the coupling of an electromagnetic actuator whose external diameter may be markedly greater than the external diameter of the valve body around the direction of engagement.

The valve body thus furnished with its fitted shoulder can be used with a large dimension electromagnetic actuator, particularly in the case where a considerable actuation force is necessary in the conditions of use of the solenoid valve thus formed.

This implementation is also rapid, and the shoulder thus produced will be capable of withstanding very strong mechanical stresses during the operation of the solenoid valve.

Advantageously, the valve body may have a generally axi-symmetric outer cylindrical shape.

Thus, the blank may be precision ground by a throughfeed precision grinding process and no longer by a plunge-cut precision grinding process. The throughfeed precision grinding process is less costly and simpler to implement than the plunge-cut precision grinding process.

According to one embodiment of the invention, the electromagnetic actuator may comprise:

a generally cylinder-shaped winding defining at its center a cylindrical housing between a first end and a second end along the direction of engagement, a casing, placed around the winding, closing off the cylindrical housing of the winding on the first end and holding a ferromagnetic washer against the first end to form a first pole of the magnetic circuit, a magnetic core that can be moved in longitudinal translation in the cylindrical housing of the winding.

The casing may be made of plastic which makes it possible to substantially lighten the solenoid valve thus formed thereby reducing the costs of production.

Preferably, the mechanical connection may comprise a rod sliding in an axial cylindrical bore of the valve body to actuate the stopper during the movements of the movable magnetic core.

Advantageously, the valve body may comprise an axial nose partially engaged in the cylindrical housing of the winding and forming a second pole of the magnetic circuit.

The solenoid valve is thus easier to mount, the axial nose providing an easy centering of the valve body relative to the winding of the electromagnetic actuator. In the case where the valve body consists of a ferromagnetic material, the latter thus comes to effectively close the magnetic loop of the electromagnetic actuator to provide it with an excellent operation.

According to the invention, the axial nose may be a fixed ferromagnetic core fitted at the end of the valve body.

In particular this makes it possible to use, to form the valve body, a material more suited to the particular requirements of use of the solenoid valve, without, for all that, compromising the correct operation of the latter. It will be possible, for example, to produce the valve body in aluminum for the purpose of reducing the weight of the solenoid valve.

Advantageously, the fixed core may be held on the electromagnetic actuator by at least one core retaining piece, fitted and attached on the periphery of the fixed core and held by the jacket.

The mounting of the fixed core is therefore simple, safe and low cost since the production of a shoulder is then not necessary and the same advantages are derived therefrom as when producing the shoulder on the valve body by means of a fitted retaining piece.

In this case, the core retaining piece may be made of ferromagnetic material to magnetically connect the fixed core to the jacket, the valve body being made of nonmagnetic material.

As an alternative, the valve body may be made of ferromagnetic material, and at least one of the matching half-washers is made of ferromagnetic material and magnetically connects the valve body to the jacket.

BRIEF DESCRIPTION OF THE DRAWINGS

Other objects, features and advantages of the present invention will emerge from the following description of particular embodiments given with reference to the attached figures, wherein.

DESCRIPTION OF THE PREFERRED EMBODIMENTS

Figure 1:
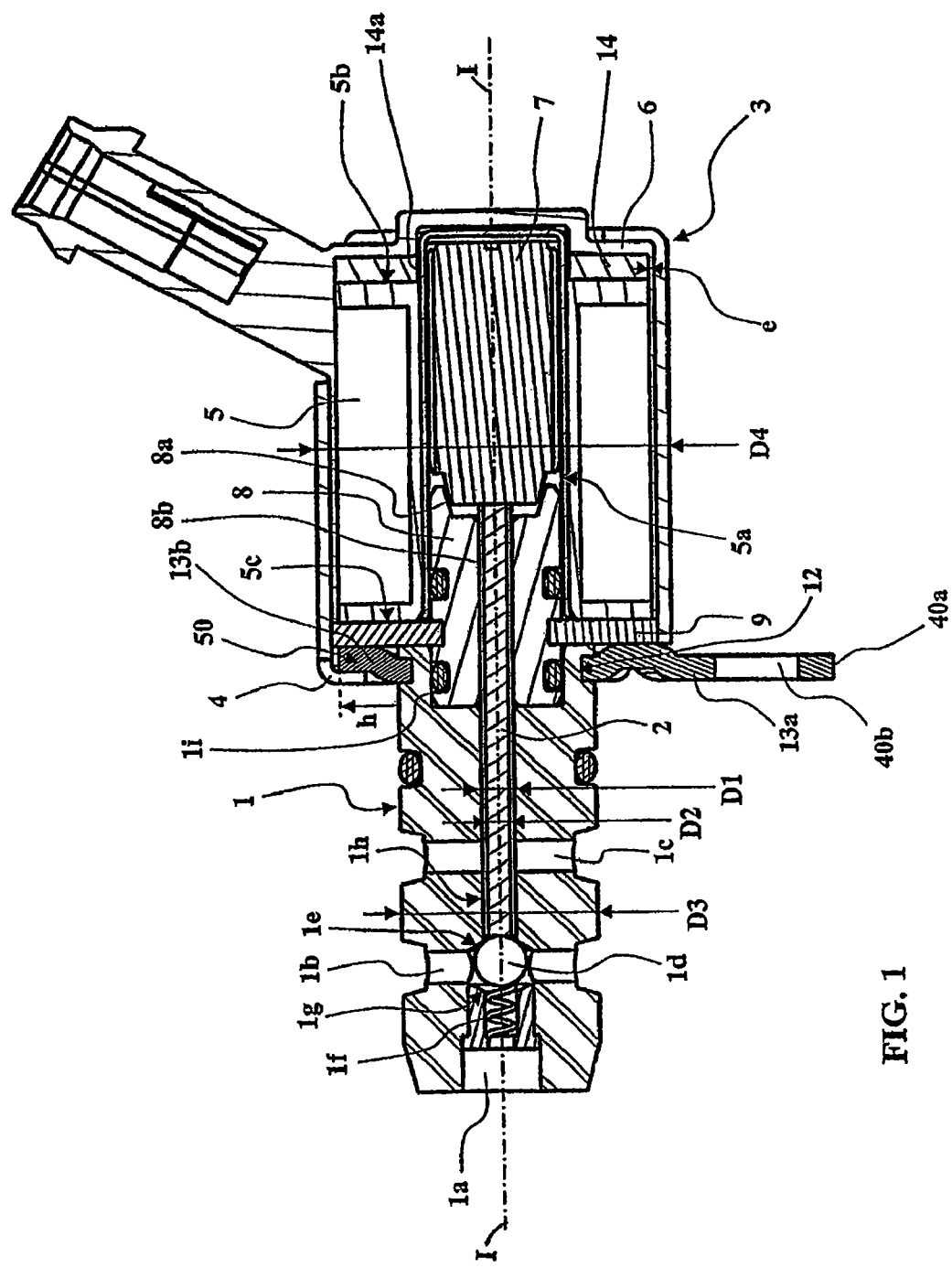
FIG. 1 is a view in section of a solenoid valve according to one embodiment of the invention.
Figure 2:
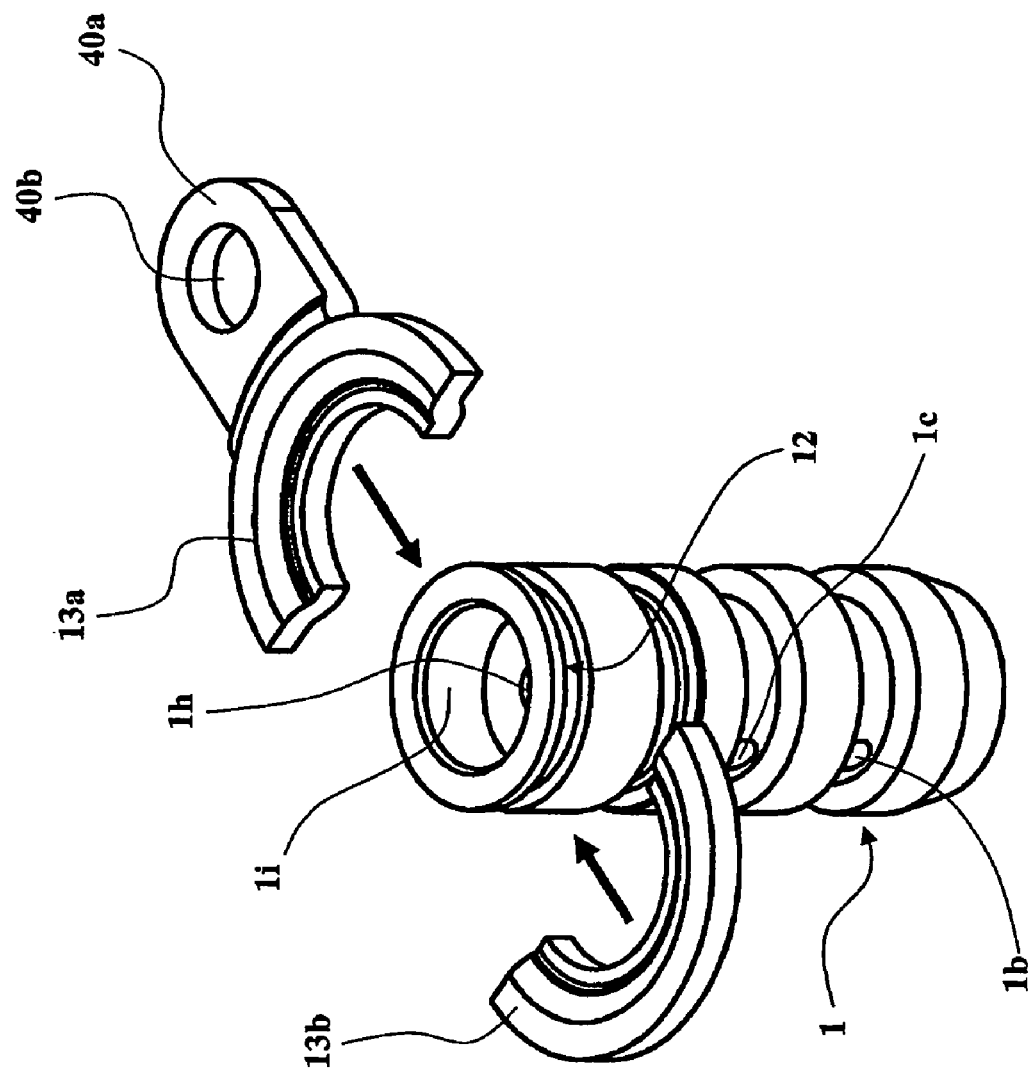
FIG. 2 is a view in perspective showing the assembly of two matching half-washers on a valve body, in the embodiment of FIG. 1.

In the embodiment represented in FIGS. 1 and 2, a solenoid valve for controlling the flow of a fluid in a hydraulic circuit according to the invention comprises in particular a valve body 1 furnished with an axial fluid duct 1a and two transverse fluid ducts 1b and 1c. The valve body 1 comprises a stopper 1d in the shape of a ball to allow or prevent the flow of fluid in the fluid ducts 1a, 1b and 1c. The valve body 1 has a coupled end (i.e., the top end of valve body 1 shown in FIG. 1) that is coupled to the electromagnetic actuator 3 and a free end (i.e., the bottom end of valve body 1 shown in FIG. 1). The free end defines an axi-symmetric outer cylindrical shape inside which the entire valve body, including fluid ducts 1a-1c and stopper 1d, is contained. The ball 1d is held pressing against a first seat 1e by a spring 1f. The ball 1d may however be pushed away from the first seat 1e against a second opposite seat 1g.

When the ball 1d is pressing against the first seat 1e, the latter prevents any communication between the transverse fluid duct 1b and the transverse fluid duct 1c. The fluid may then circulate between the transverse duct 1b and the axial duct 1a. On the other hand, when the ball 1d is pressing against the second seat 1g, the latter blocks off the axial fluid duct 1a and authorizes the fluid to circulate between the transverse fluid ducts 1b and 1c via an axial cylindrical bore 1h in which a rod 2 is engaged with clearance.

This fluid circulation between the transverse fluid ducts 1b and 1c is made possible by the difference between the diameter D1 of the axial cylindrical bore 1h of the body 1 and the diameter D2 of the rod 2 that is engaged so as to slide in the axial cylindrical bore 1h in order to come to actuate the ball 1d.

The solenoid valve also comprises an electromagnetic actuator 3, arranged to actuate the rod 2 that itself forms a mechanical connection.

A coupling is provided between the electromagnetic actuator 3 and the valve body 1. This coupling comprises a jacket 4 that surrounds the electromagnetic actuator 3 and is engaged on a shoulder 50 fitted to the valve body 1. This jacket 4 thus holds the electromagnetic actuator 3 in axial engagement against the valve body 1 in a direction of engagement I-I.

According to the invention, the valve body 1 comprises a peripheral groove 12 at its end. The body retaining shoulder 50 comprises an assembly of two matching half-washers 13a and 13b, engaged radially in the peripheral groove 12 as shown in FIG. 2. The half-washers 13a and 13b are then retained radially in the peripheral groove 12 by the jacket 4, as illustrated in FIG. 1.

This implementation of the fitted body retaining shoulder 50 is simple, rapid and low cost.

In particular, it allows the lower cost production of a valve body 1 that has a generally axi-symmetric outer cylindrical shape.

This specifically prevents many costly machining operations and that makes it possible to save a large quantity of material.

In addition, such a generally axi-symmetric outer cylindrical shape of the valve body 1 allows a throughfeed precision grinding operation that is much less costly than the plunge-cut precision grinding that was used hitherto.

The external diameter D3 of the valve body 1 is specific to the use of the solenoid valve. The valve body 1 may, for example, be engaged in a bore of an engine block to control the flow of a fluid in a hydraulic circuit made in the engine block. The bore of the engine block therefore directly determines the external diameter D3 that must be given to the valve body 1.

As for the electromagnetic actuator 3, the latter has an external diameter D4 that is a function of the force that needs to be applied to the ball 1d to control the flow of fluid in the hydraulic circuit. This force therefore depends on the return force exerted by the spring 1f and on the pressure of the fluid circulating in the ducts 1a, 1b and 1c. Thus, the actuation force is specific to the use that is desired to be made of the solenoid valve, and the external diameter D4 depends thereupon.

It is emphasized that the external diameters D3 and D4 may consequently be very different. The shoulder 50 may thus have a height h that may be considerable, and, according to the invention, this does not increase the cost of manufacturing the solenoid valve. On the contrary, with the techniques used hitherto, the cost of producing a solid axi-symmetric cylindrical valve body is proportional to its height h.

The electromagnetic actuator 3 comprises a generally cylindrical shape winding 5 defining at its center a cylindrical housing 5a between a first end 5b and a second end 5c, along the direction of engagement I-I.

The electromagnetic actuator 3 also comprises a casing 6 placed around the winding 5, closing off the cylindrical housing 5a of the winding 5 at the first end 5b. The housing 6 may be made of plastic, and it holds a ferromagnetic washer 14 against the first end 5b to form a first pole 14a of the magnetic circuit. The jacket 4 may advantageously be made of ferromagnetic material, and thus forms the main armature piece to conduct the magnetic field produced by the winding 5.

The plastic casing 6 has a thin thickness e separating the ferromagnetic jacket 4 and the washer 14 so that magnetic conduction is possible between these two elements. It is also possible, to improve this magnetic conduction, that the washer 14 comprises peripheral teeth engaged in grooves made over the whole length of the plastic casing 6, teeth that then come into contact without airgap with the jacket 4.

A magnetic core 7 is mounted so as to be movable in longitudinal translation in the direction of engagement I-I in the cylindrical housing 5a of the winding 5.

The rod 2 presses axially against the movable magnetic core 7 and slides in a cylindrical axial bore 1h of the valve body 1 under the pressure of the movable magnetic core 7 when the latter slides in the cylindrical housing 5a of the winding 5. This is how the ball 1d is actuated to allow or prevent the flow of fluid in the ducts 1a, 1b and 1c.

In the embodiments of FIGS. 1 and 2, the movement of the movable magnetic core 7 in the cylindrical housing 5a of the winding 5 is limited by a ferromagnetic fixed core 8. This fixed core 8 is partially engaged in the cylindrical housing 5a of the winding 5 and forms a second pole 8a of the magnetic circuit. It is pierced with an axial bore 8b for the rod 2 to slide freely.

This fixed core 8 is held on the electromagnetic actuator 3 by a core retaining piece 9 fitted and attached on the periphery of the fixed core 8 and held by the jacket 4.

The core retaining piece 9 may advantageously be made of ferromagnetic material, magnetically connecting the jacket 4 to the fixed core 8 that may also be made of ferromagnetic material. A magnetic loop is thus formed by the jacket 4, the core retaining piece 9, the fixed core 8 and the washer 14. This magnetic loop makes it possible to channel the magnetic field produced by the winding 5 to generate an actuation force in order to move the movable magnetic core 7 in the cylindrical housing 5a.

When the winding 5 is supplied, the movable magnetic core 7 moves in the cylindrical housing 5a toward the fixed core 8 in the direction of engagement I-I and thus causes the rod 2 to slide in the axial cylindrical bore 1h of the valve body 1 and in the axial bore 8b of the fixed core 8 to push the ball 1d against the return force exerted by the spring 1f. The ball 1d thus comes to block off the second seat 1g to prevent the circulation of fluid in the axial duct 1a and then to allow the fluid to flow in the transverse ducts 1b and 1c, the fluid being able to circulate in the axial cylindrical bore 1h due to the diameter D1 of the rod 2 that is less than the internal diameter of the axial cylindrical bore 1h.

When the winding 5 is no longer supplied, the latter exerts no actuation force on the mobile magnetic core 7, and the spring 1f pushes the ball 1d against the first seat 1e while causing the rod 2 to slide in the axial cylindrical bore 1h and the movable magnetic core 7 in the cylindrical housing 5a toward the first pole 14a in the direction of engagement I-I.

In the embodiment illustrated in FIG. 1, the external diameter D3 of the valve body 1 is greater than the diameter of the cylindrical housing 5a. In this case, the fixed core 8 has a smaller diameter, suitable for blocking off the cylindrical housing 5a at the second end 5c of the winding 5 while centering the valve body 1 on the electromagnetic actuator 3. The fixed core 8 is engaged at its other end in a matching axial housing 1i of the valve body 1. The largest outside diameter, i.e., external diameter D3, is of one diameter over an entire length of the valve body 1, other than for the at least one fluid duct 1b, 1c or at least one peripheral groove 12.

However, if the external diameter D3 were equal to the diameter of the cylindrical housing 5a of the winding 5, it could be envisaged that the valve body 1 itself comprises an axial nose partially engaged in the cylindrical housing 5a of the winding 5 and forming the second pole 8a of the magnetic circuit. In order to close the magnetic loop, the valve body 1 and at least one of the matching half-washers 13a, 13b for retaining the body 1 would then be made of ferromagnetic material.

Using a fixed core 8 is thus useful, on the one hand, when the external diameter D3 of the body 1 is different from the diameter of the cylindrical housing 5a, and, on the other hand, when it is desired to produce a valve body 1 out of a nonferromagnetic material, out of aluminum for example, in order to lighten the solenoid valve, or because, in the context of use of the solenoid valve, a particular nonferromagnetic material is required for the valve body 1.

In the particular embodiment represented in the figures, one of the matching half-washers, in this instance the half-washer 13*a*, is extended radially to itself form an attachment lug 40*a* of the solenoid valve. The attachment lug 40*a* is, for example, pierced with a hole 40*b* for a fastening screw to pass through. The attachment lug 40*a* is at the interface between the valve body 1 and the electromagnetic actuator 3, and may press on the external face of a hydraulic block into which the valve body 1 is inserted.

In the embodiment illustrated in the figures, the casing 6 is made of light, low cost material, for example of plastic.

However, it is possible to conceive, where necessary, that the casing 6 is made of ferromagnetic material. The casing 6 then participates in conducting the magnetic field in the magnetic loop.

This helps to obtain a greater actuation force.

The present invention is not limited to the embodiments that have been explicitly described, but it includes the various variants and generalizations thereof contained in the field of the following claims.

What is claimed:

1. A solenoid valve for controlling the flow of a fluid in a hydraulic circuit, comprising:
    a metallic valve body defining a valve portion having at least one fluid duct, at least one peripheral groove, a stopper for allowing or preventing the flow of fluid in the fluid duct and a mechanical connection to actuate the stopper,
    an electromagnetic actuator arranged to actuate the mechanical connection,
    a coupling between the electromagnetic actuator and the valve body, via a jacket surrounding the electromagnetic actuator and engaged with a shoulder fitted to the valve body, that holds the electromagnetic actuator in axial engagement against the valve body in a direction of engagement,
    wherein the valve body has a first end that is coupled to the electromagnetic actuator and a second end, the second end an axi-symmetric outer cylindrical shape inside which the entire valve portion is contained, and wherein the shoulder comprises an assembly of two matching half-washers, engaged radially in the peripheral groove and held radially in the peripheral groove by the jacket.

2. The solenoid valve according to claim 1, wherein the external diameter of the electromagnetic actuator is markedly greater than the external diameter of the valve body around the direction of engagement.

3. The solenoid valve according to claim 1, wherein electromagnetic actuator comprises
    a generally cylinder-shaped winding defining at its center a cylindrical housing between a first end and a second end along the direction of engagement,
    a casing, placed around the winding, closing off the cylindrical housing of the winding on the first end and holding a ferromagnetic washer against the first end to form a first pole of the magnetic circuit,
    a magnetic core that can be moved in longitudinal translation in the cylindrical housing of the winding.

4. The solenoid valve according to claim 3, wherein the mechanical connection comprises a rod, sliding in an axial cylindrical bore of the valve body to actuate the stopper during the movements of the movable magnetic core.

5. The solenoid valve according to claim 3 wherein the valve body comprises an axial nose partially engaged in the cylindrical housing of the winding and forming a second pole of the magnetic circuit.

6. The solenoid valve according to claim 5, wherein the axial nose is a fixed ferromagnetic core fitted at the end of the valve body.

7. The solenoid valve according to claim 6, wherein the fixed core is held on the electromagnetic actuator by at least one core retaining piece, fitted and attached on the periphery of the fixed core and held by the jacket.

8. The solenoid valve according to claim 7, wherein the said at least one core retaining piece is made of ferromagnetic material and magnetically connects the fixed core to the jacket, the valve body being made of nonmagnetic material.

9. The solenoid valve according to claim 3, wherein the valve body is made of ferromagnetic material, and at least one of the matching half-washers is made of ferromagnetic material and magnetically connects the valve body to the jacket.

10. The solenoid valve according to claim 1, wherein in at least one of the said matching half-washers is extended radially to form an attachment lug of the solenoid valve.

11. A solenoid valve for controlling the flow of a fluid in a hydraulic circuit, comprising:
    a metallic valve body having at least one fluid duct, at least one peripheral groove, a stopper for allowing or preventing the flow of fluid in the fluid duct and a mechanical connection to actuate the stopper,
    an electromagnetic actuator arranged to actuate the mechanical connection,
    a coupling between the electromagnetic actuator and the valve body, via a jacket surrounding the electromagnetic actuator and engaged with a shoulder fitted to the valve body, that holds the electromagnetic actuator in axial engagement against the valve body in a direction of engagement,
    wherein the valve body has an axi-symmetric outer cylindrical shape that defines a largest outside diameter, the largest outside diameter is of one diameter over an entire length of the valve body, other than for the at least one fluid duct or at least one peripheral groove.

12. The solenoid valve according to claim 1, wherein the shoulder comprises an assembly of two matching half-washers, engaged radially in the peripheral groove and held radially in the peripheral groove by the jacket.

* * * * *

UNITED STATES PATENT AND TRADEMARK OFFICE
CERTIFICATE OF CORRECTION

PATENT NO.         : 7,686,038 B2                                           Page 1 of 1
APPLICATION NO.    : 11/452665
DATED              : March 30, 2010
INVENTOR(S)        : Samuel Chavanne It is certified that error appears in the above-identified patent and that said Letters Patent is hereby corrected as shown below:

At Column 7, line 24, delete "defining a valve portion"

At Column 7, line 37, "first end" should read -- coupled end --

At Column 7, line 38, "second end, the second" should read -- free end, the free --

At Column 7, line 39, after "end" insert -- defines --

At Column 7, line 40, "valve portion" should read -- valve body --

Signed and Sealed this

Fifteenth Day of February, 2011

David J. Kappos
*Director of the United States Patent and Trademark Office*